May 31, 1966 J. FARNAM 3,253,340

HOLDER FOR THREAD MEASURING WIRES

Filed June 24, 1963

*INVENTOR.*
JACK FARNAM

BY  *Head & Johnson*

ATTORNEYS

United States Patent Office 3,253,340
Patented May 31, 1966

3,253,340
HOLDER FOR THREAD MEASURING WIRES
Jack Farnam, Tulsa, Okla., assignor to Charles H. Reeder, Tulsa, Okla.
Filed June 24, 1963, Ser. No. 290,090
9 Claims. (Cl. 33—199)

This invention relates to an improved holder for thread measuring wires. More particularly, this invention relates to an improved device for holding parallel gage wires used in measuring the pitch diameter of externally threaded elements.

The words "externally threaded element" as used herein refers to any circular or cylindrical body having one or more externally threaded sections of uniform diameter such as screws, bolts, externally toothed gears and the like.

The pitch diameter of an externally threaded element can be defined generally as the diameter of an imaginary cylinder, the surface of which would pass through the threads at such a point as to make the thickness of the thread equal to the width of the space between the threads, as cut by the surface of the imaginary cylinder.

The commonly used method of measuring the pitch diameter of externally threaded elements is referred to as the "three wire method." This method requires the use of three parallel straight wires of circular cross-section, two of which are positioned on one side of the threaded element in contact with the inclined sides of adjacent threads and the third wire placed within the thread groove diametrically opposite the threads contacted by the first two wires. A conventional micrometer is then positioned across the outer exposed surfaces of the three wires and a measurement is recorded. The pitch diameter is then easily calculated by substituting known or measured values into a precalculated formula.

For example, in calculating the pitch diameter for the American Standard thread, the following formula is used:

$$X = \frac{D + 3W - C}{1.515}$$

where:
$X$=Pitch diameter of the element,
$D$=Major diameter of the element,
$C$=The measurement across the wires, and
$W$=The diameter of the wires.

The major diameter of the element and the diameter of the wires are easily determined with a conventional micrometer. The measurement across the wire is also determined by the micrometer. Therefore, the pitch diameter is the only unknown in the above cited formula and can be easily calculated mathematically.

It has been found in using prior known methods of measuring pitch diameter that positioning and holding the gage wires in contact with the threaded element and calipering the distance across the wires at the same time is extremely difficult even for highly trained machinists. Many of the prior pitch diameter measuring apparatus are limited in the size of element that they can measure. This limit results from the fact that the gage wires commonly used are only three inches long and are mounted on a single rod or base element with one wire slidable thereon to allow for variations in threaded element size. With such a tool the upper limit on the size of the element that can be measured is approximately three inches.

It has further been found with the more conventional gage wire holders that there is some danger of slippage of the wires out of contact with the threaded element. Also, the wires are easily moved out of the required parallel relation resulting in errors in measurement and requiring time consuming corrections to be made.

Since it is required that the gage wires be of sufficiently large diameter that they will extend above the crest of the threads while contacting the inclined surfaces of adjacent threads, gage wires must be continuously replaced by wires of different diameters to accommodate elements that have different sized threads.

With the more conventional holders, to change the spacing between the two adjacent wires that contact the one side of the threaded element as required when measuring threaded elements having different numbers of threads per inch, the entire set of gage wires and oftentimes a portion of the holder device will have to be removed and replaced with a set of wires having the desired spacing for the two adjacent wires.

Therefore it is an object of this invention to provide a holder for thread measuring wires that overcomes the disadvantage of prior holders and methods.

Another object of this invention is to provide a holder for thread measuring wires that it easily manipulated to bring the wires in contact with the threaded element while at the same time calipering the distance across the wires.

A further object of this invention is to provide a holder for thread measuring wires in which the gage wires can be expanded on inclined connector elements of the holder to permit the measurement of relatively large pitch diameters.

Yet another object of this invention is to provide a holder for thread measuring wires in which the individual gage wires are retained within parallel grooves or serrations by the action of relatively strong compression springs, thereby lessening the possibility of or completely preventing slippage of the wires.

A still further object of this invention is to provide a holder for thread measuring wires in which the gage wires can be easily and quickly removed and replaced with gage wires of different size.

Yet another object of this invention is to provide a holder for thread measuring wires which maintains the gage wires at all times in parallel relation.

Yet a further object of this invention is to provide a holder for thread measuring wires which is provided with a plurality of positions for receiving and retaining the gage wires thereby permitting the quick and relatively easy changing of the spacing between two adjacent wires as required when measuring a threaded element with a different number of threads per inch.

Further objects and advantages of this invention will be apparent from the following description and appended claims, reference being had to the accompanying drawings forming a part of the specification wherein like reference characters designate corresponding parts in the several views.

General description

The holder apparatus of this invention generally comprises a three-sided substantially rectangular-shaped support member having pivotally attached to the upper end portion thereof one end of a set of two parallel spaced apart legs and pivotally attached to the bottom end portion thereof one end of a set of two parallel spaced apart legs, all four legs being equal in length. Attached to the other end of the first set of legs is a first gage wire retainer member. Attached to the other end of the second set of legs is a second gauge wire retainer member. Typically, the bottom surface of each wire retainer member is provided with a plurality of parallel serrations or grooves for receiving therein the gage wires. A tubular spring biased keeper having a square cross-section is received upon an end of each retainer member to co-act with the serrated surface of each member to retain the gage wires fixed with respect to the retainer member of within the serrations of that member.

*Specific description*

Figure 1:
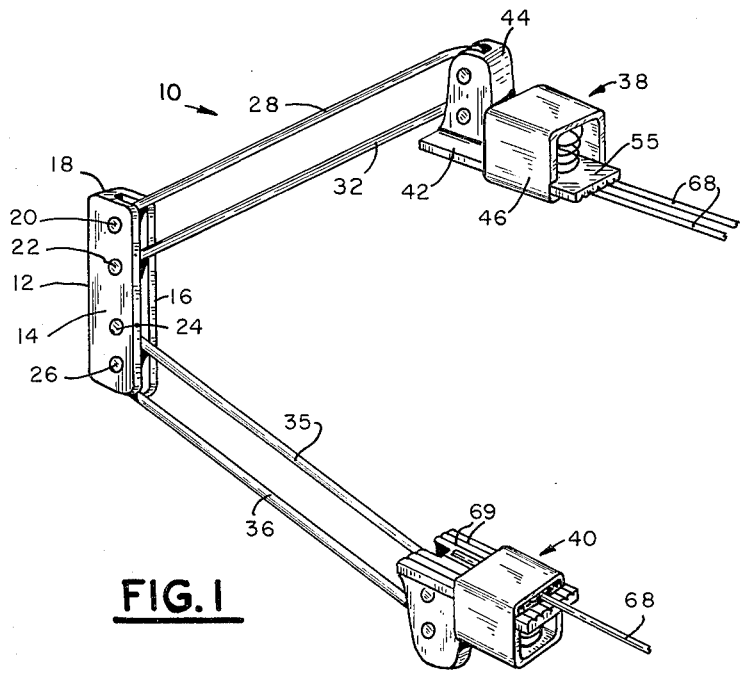
FIGURE 1 is a perspective view of the holder of this invention with the gage wires retained thereon.
Figures 2, 4:
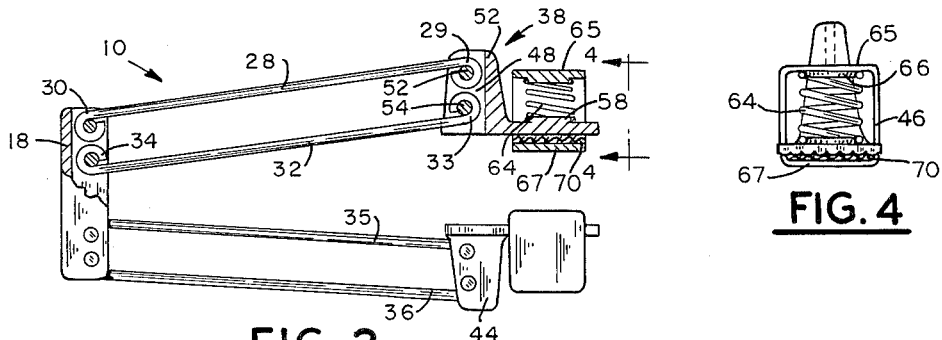
FIGURE 2 is a side elevational and partly sectional view of the holder of this invention.
FIGURE 4 is a view of the holder in FIGURE 2 taken along line 4—4.
Figure 3:
FIGURE 3 is a top view of the holder.

For a more specific description of this invention, reference is now made to the drawings in general and particularly to FIGURES 1 and 2. Holder 10 includes a three-sided substantially rectangular shaped support member 12 consisting of two parallel spaced apart plates 14 and 16 connected along their back longitudinal edge by a back plate 18. Extending between parallel plates 14 and 16 in the upper portion of support member 12 are two parallel, spaced apart pins 20 and 22. Also extending between parallel plates 14 and 16 in the lower portion of support member 12 are two more parallel pins 24 and 26. Pins 20, 22, 24 and 26 are all parallel and the spacing between pins 20 and 22 is equal to the spacing between pins 24 and 26. Also, the spacing of the pins is in a direction along the longitudinal length of the support member 12.

Pins 20 through 26 can take a multitude of forms such as, for instance, externally threaded screws, bolts or rivets. Pins 20 through 26 function primarily to pivotally attach first and second connector means to the support member 12. A secondary function of pins 20 through 26 is to maintain plates 14 and 16 in their spaced apart, parallel position.

The first parallelogram link type-connector means consists of a first leg 28, one end of which is provided with a loop 30 which is received about pin 20, between parallel plates 14 and 16. A second leg 32 is provided with a similar loop 34 which is received about pin 22, between parallel plates 14 and 16. The second parallelogram link type-connector means consists of first and second legs 35 and 36, respectively, which are pivotally connected to pins 24 and 26, respectively, in the manner just described in reference to first and second legs 28 and 32.

Pivotally connected to the other ends of the first and second parallelogram link type-connector means are first and second gage wire retainer members 38 and 40, respectively. Since first and second retainer members 38 and 40, respectively, are of the same construction, only first retainer member 38 will be described herein.

Gage wire retainer member 38 consists of the combination of a grooved plate 42 having a raised portion 44 on the rearward end portion thereof for connection to the first and second legs 28 and 32, respectively, of the first connector member, and a tubular spring biased keeper 46 having a square cross-section.

Raised portion 44 is provided with two parallel sides 48 and 50 and a substantially solid frontal portion 52. The free ends of first and second legs 28 and 32, respectively, are provided with loops 29 and 33, respectively, which are received within the space between parallel sides 48 and 50 of the first retainer member and are retained therein by parallel spaced apart pins 52 and 54, respectively. Pins 52 and 54 extend through the sides 48 and 50 in the manner similar to that described previously with reference to pins 20 and 22 in support member 12.

The space 56 between sides 48 and 50 extends through the grooved plate 42 to provide a continuous opening through grooved plate 42 and raised portion 44 to accommodate the legs 28 and 32 when the holder is extended in its maximum position.

The grooved plate portion of the retainer member is provided on the frontal portion of the side 55 opposite the side having the grooves or serrations, with a circular boss 58 extending in the same direction as the raised portion 44.

The frontal portion 60 of grooved plate 42 is provided with a section of reduced width for receiving and retaining thereabout the keeper 46. The internal width of keeper 46 is approximately equal to the external width of the reduced section of frontal portion 60 of retainer member 40. Therefore, keeper 46 must be rotated approximately 45° in order for the forwardmost portion 62 of grooved plate 42 to pass therethrough. Keeper 46 is then rotated back into its normal position as shown in FIGURE 4 and a compression spring 64 is placed therein extending between the interior surface of side 65 of the keeper and the top side 55 of grooved plate 42. A boss 66 is provided on the interior surface of side 65 of the keeper for cooperating with boss 58 on the grooved plate to retain compression spring 64 within the keeper 46.

It should be noted that spring 64 will urge keeper 46 upwardly relative to plate 42 thereby bringing bottom side 67 of keeper 46 upwardly into contact with the grooved side of plate 42.

To place the gage wires 68 in position on retainer member 38, keeper 46 is depressed downwardly relative to the grooved plate 42, against the biasing force of compression spring 64 to provide a space (not shown) between the interior of the bottom side 67 of the keeper and the grooved surface of plate 42. Wires 68 are then inserted within the appropriate groove 69 and the keeper is released. Therefore, the wires 68 will be clamped onto the retainer member 38 between the bottom 67 of keeper 46 and the grooved surface of plate 42.

It has been found that the effectiveness with which plate 42 and keeper 46 grip the wires 68 can be greatly increased by attaching a thin section of felt or similar resilient material 70 to the interior surface of bottom side 67 of keeper 46.

Figure 7:
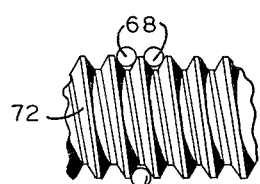
FIGURE 7 is an elevational view of a threaded element with the gage wires in position thereacross for the measurement of the pitch diameter.
Figures 5, 6:
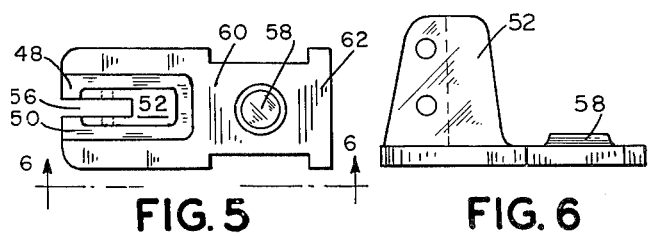
FIGURE 5 is a top view of the gage wire retainer member of this invention.
FIGURE 6 is a view of the gage wire retainer member of FIGURE 5 taken along lines 6—6.

FIGURE 7 shows the position that will be assumed by the gage wires 68 relative to an externally threaded element 72 during the measurement of the pitch diameter of element 72. As can be seen in FIGURE 7, two gauge wires are positioned in contact with the inclined surfaces of three adjacent threads on one side of the element and the third wire is positioned in contact with the inclined surfaces of two adjacent threads, diametrically opposite the first two wires. While in this position a conventional micrometer (not shown) can be placed across the wires to obtain what was referred to above as the measurement across the wires. This measurement, taken with the known major diameter of the element and the known wire diameter, can be placed in a predetermined formula to calculate the pitch diameter of the threaded element.

Of particular importance in the holder of this invention are the first and second parallelogram link-type-connector means for connecting first and second retainer members 38 and 40 to the support member 12. By using this type of connector means, the gage wires 68 are at all times retained in a strictly parallel relation. As the holder is expanded, that is, as first and second retainer members 38 and 40 are moved apart, the retainer members will pivot with respect to their respective connector means, with their grooved or serrated plate portions and attached gage wires remaining at all times parallel.

Another advantage realized from the use of this type of holder is a substantially increased upper limit on the size of threaded element that can be measured or gaged by this holder. It should be evident from FIGURE 1 that as the holder is expanded it assumes an on-side V-shape with the gage wires 68 extending outwardly in parallel relation from the feet of the leg portions of the V, and with the threaded element to be measured located between the gage wires. Therefore, when measuring a threaded element that has a diameter greater than three inches, the length of conventionally used gage wires, a portion of the element will extend into the apex portion of the V-shaped holder.

It should be understood that the maximal limit of size of an element that can be measured with the holder of this invention can be increased by simply increasing the length of the first and second connector means that hold the retainer members to the support member 12. It is appreciated that as the length of these connector members increase the problems of accuracy of manufacture will be substantially increased. However, for the size holder ordinarily used, the holder can be manufactured with a very high degree of accuracy. The accuracy referred to is the accuracy in producing or manufacturing legs 28, 32, 35 and 36 of the two connector means exactly equal, with the two legs of each connector means being exactly parallel. Any inaccuracies in the length or parallel relation of the respective legs of the connector members will result in something less than a parallel relation between the gage wires 68.

Also important in this invention is the provision of the plurality of grooves in the plate 42 of the retainer members 38 and 40 for retaining therein the gage wires 68. Since there are a plurality of parallel grooves, the spacing between the adjacent wires 68 can be easily varied to accommodate threaded elements having a various number of threads per inch by simply placing one of the gage wires 68 in a groove spaced from the groove containing the other wire by a distance equal to the distance between adjacent threads of the threaded element.

The holder of this invention is adjustable for externally threaded elements having varying overall diameter and number of threads per inch. Furthermore, this holder is expansible sufficiently to accommodate elements of relatively large external diameters, even when employing gage wires of the conventional three-inch length. The gage wires retained by this holder are maintained at all times in strict parallel relation.

Furthermore, the holder of this invention can be utilized to measure the pitch diameter of any externally threaded element including toothed gears. In measuring the pitch diameter of an externally toothed gear having an even number of teeth, two wires only are required; with one wire being positioned in each of the retainer members 38 and 40. When measuring the pitch diameter of an externally threaded gear having an odd number of teeth, the same procedure is used as that set forth above for the measuring of the pitch diameter of an externally threaded screw, using three gage wires.

It should be noted that the references in this application to direction, such as "upward," "downward," "front" and "back," were for the convenience of description only and were not intended as a limit on the scope of the invention as it is contemplated that the holder of this invention can be oriented in a variety of positions or directions during use thereof.

The invention has been described by reference to specific and preferred embodiments. It will be apparent, however, that many modifications can be made without departing from the spirit and scope of the invention. Accordingly, the invention should be construed not to be limited to the embodiments herein described, but should be limited only by the scope of the appended claims.

What is claimed:

1. A holder for thread measuring wires comprising,
   a support member;
   a first retainer means for releasibly holding at least one thread measuring wire;
   a second retainer means for releasably holding at least one thread measuring wire;
   a first parallelogram link-type-connector means pivotally attached at one end to said support member and at the other end to said first retainer means; and
   a second parallelogram link-type-connector means pivotally attached at one end to said support member and at the other end to said second retainer means, whereby said first and second connector means are pivotally expansible in a common plane about said support member while maintaining said first and said second retainer means at all times parallel.

2. A holder for thread measuring wires comprised of:
   a vertically elongated support member;
   a first retainer member for releasably holding at least one thread measuring wire;
   a second retainer member for releasably holding at least one thread measuring wire;
   an elongated first parallelogram link-type-connector means pivotally attached at one end to said support member and pivotally attached at the other end to said first retainer member; and
   an elongated second parallelogram link-type-connector means pivotally attached at one end to said support member and at the other end to said second retainer member, said first and said second connector means being independently pivotally movable about said base member in a common plane.

3. A holder for thread measuring wires according to claim 2, wherein
   said first connector means consists of a set of two equal length spaced apart parallel legs, and
   said second connector means consists of a set of two equal length spaced apart parallel legs, the legs of said first and said second connector means being equal in length and lying in a common plane.

4. A holder for thread measuring wires according to claim 2, wherein said first retainer means is comprised of
   a substantially flat two sided plate portion provided on one side with at least one thread measuring wire receiving groove and provided on the other side with an upset portion for attachment to said first connector means; and
   a spring biased keeper for gripping said at least one thread measuring wire between said spring biased keeper and the side of said plate portion provided with said at least one thread measuring wire receiving groove;
   and wherein said second retainer member is comprised substantially the same as said first retainer means with the raised portion of said second retainer means attached to said second connector means.

5. A holder for thread measuring wires according to claim 2 wherein said first retainer means is comprised of
   a substantially flat horizontal two sided plate portion provided on one side with at least one thread measuring wire receiving groove and provided on one end portion of the other side with an upset portion extending at substantially right angles to said plate portion for attachment to said first connector means;
   a tubular keeper having a square cross-section received about the end of said plate portion opposite the end provided with said upset portion;
   a compression spring positioned internally of said keeper and extending between a first internal surface of said keeper and the side of said plate portion provided with said upset portion thereby to urge a second internal surface of said keeper against the side of said plate portion provided with said at least one thread measuring wire receiving groove to releasably hold at least one thread measuring wire therein.

6. A holder for thread measuring wires according to claim 5 wherein a resilient pad is located between the side of said plate portion provided with said at least one thread measuring wire receiving groove and said thread measuring wire contained therein on one side and said second internal surface of said keeper on the other side.

7. A holder for thread measuring wires comprised of:
   a substantially rectangular shaped support member having two parallel spaced apart side plates joined together along one long edge by a back plate;

a first retainer means for releasably holding at least one thread measuring wire, said first retainer means consisting of a two sided flat substantially rectangular shaped plate portion one side of which is provided with at least one longitudinally extending thread measuring wire receiving groove and the other side of which is provided at one end thereof with an upset portion, a tubular keeper having a square cross-section received about the end of said rectangular plate opposite the end provided with said upset portion, and a compression spring extending between the interior surface of a first side of said keeper and the side of said rectangular plate having the upset portion to urge the interior surface of a second side of said keeper against the side of said plate portion provided with said at least one longitudinal groove;

a second retainer means for releasably holding at least one thread measuring wire of the same description as said first retainer means;

a first parallelogram-type connector means comprised of two equal length spaced apart parallel legs pivotally attached at one end to one end portion of said support member and at the other end to said raised portion of said first retainer means;

a second parallelogram-type connector means comprised of two equal length spaced apart parallel legs pivotally attached at one end to the other end portion of said support member and at the other end to said raised portion of said second retainer means, the length of said two legs of said first connector means being equal to the length of said two legs of said second connector means, said first and said second connector means being pivotally expansible in a common plane about said support member.

8. A holder for thread measuring wires comprised of;

an elongated rectangular shaped support member having two parallel spaced apart side plates joined together along one long edge by a back plate;

a first retainer means for releasably holding at least one thread measuring wire comprised of a two sided rectangular shaped plate portion provided on one side with a plurality of parallel longitudinal grooves for receiving therein a plurality of thread measuring wires, and on one end of the other side with an upset portion extending substantially at right angles to said plate portion, a tubular spring biased keeper having a square cross-section received about the end of said plate portion opposite the end provided with said upset portion for grippingly retaining said at least one thread measuring wire between one internal surface thereof and said side of said plate portion provided with said plurality of grooves;

a second retainer means for releasably holding at least one thread measuring wire, said second retainer means comprised substantially the same as said first retainer means;

a first parallelogram-type connector means for pivotally connecting said first retainer means to said support member consisting of a set of two equal length spaced apart parallel legs pivotally attached at one end to one end portion of said support member and at the other end to said raised portion of said first retainer means;

a second parallelogram-type connector means for pivotally connecting said second retainer means to said support member consisting of a set of two equal length spaced apart parallel legs pivotally attached at one end to the other end portion of said support member and at the other end to said raised portion of said second retainer means, said legs of said first and said second connector means being equal in length and coplanar, and said first and said second connector means being pivotally expansible in a common plane about said support member.

9. A holder for thread measuring wires according to claim 8, wherein a substantially flat resilient pad is located on said first and second retainer means, between the side of said plate portion provided with said plurality of parallel grooves and said at least one thread measuring wire contained therein on one side of said pad and said one internal surface of said keeper on the other side of said pad.

References Cited by the Examiner

UNITED STATES PATENTS

| | | | |
|---|---|---|---|
| 1,897,407 | 2/1933 | Timm | 33—108 X |
| 2,131,693 | 9/1938 | Smith | 248—281 X |
| 2,399,642 | 5/1946 | Bunch | 33—199 |
| 2,509,886 | 5/1950 | Sachtleber | 33—199 X |
| 2,554,024 | 5/1951 | Govoni | 33—109 |
| 2,692,438 | 10/1954 | Schneider | 33—199 |
| 3,068,582 | 12/1962 | Crossley | 33—199 |
| 3,153,286 | 10/1964 | Buisson | 33—68 |

ISAAC LISANN, *Primary Examiner.*

JOHN D. BOOS, *Assistant Examiner.*